United States Patent
Wang

(10) Patent No.: US 6,890,084 B2
(45) Date of Patent: May 10, 2005

(54) LASER MEASURING DEVICE

(76) Inventor: Chien-Kuo Wang, 6F-6, No. 130, Sec. 2, Jung Shiau E. Rd., Taipei (TW)

( * ) Notice: Subject to any disclaimer, the term of this patent is extended or adjusted under 35 U.S.C. 154(b) by 0 days.

(21) Appl. No.: 10/620,214

(22) Filed: Jul. 15, 2003

(65) Prior Publication Data

US 2005/0024854 A1   Feb. 3, 2005

(51) Int. Cl.$^7$ ................................................. G01B 3/10
(52) U.S. Cl. ..................... 362/119; 362/109; 362/259; 33/761
(58) Field of Search ..................... 362/119, 120, 253, 362/259, 374, 375; 33/760, 755, 767, 334, 33/354, 286, DIG. 21

(56) References Cited

U.S. PATENT DOCUMENTS

| | | | |
|---|---|---|---|
| 5,594,993 A * | 1/1997 | Tager et al. ................... | 33/227 |
| 6,030,091 A * | 2/2000 | Li ................................ | 362/109 |
| 6,167,635 B1 * | 1/2001 | Lin .............................. | 33/767 |
| 6,209,219 B1 * | 4/2001 | Wakefield et al. ............. | 33/761 |
| 6,256,901 B1 * | 7/2001 | Lin .............................. | 33/767 |
| 6,536,698 B2 * | 3/2003 | Hsu ........................ | 242/381.3 |
| 6,581,296 B2 * | 6/2003 | Ponce .......................... | 33/760 |
| 6,612,046 B1 * | 9/2003 | Cimorell et al. ............. | 33/668 |

* cited by examiner

Primary Examiner—Sandra O'Shea
Assistant Examiner—Hargobind S. Sawhney

(57) ABSTRACT

A laser measuring device includes a housing, a laser head, two levels, a power supply, and a control knob. Thus, the housing has a non-symmetrical structure, so that when one of the casings of the housing is removed, the adjusting screws of the laser head are entirely exposed outward from the housing, thereby facilitating adjustment of the laser head and the levels.

10 Claims, 6 Drawing Sheets

LASER MEASURING DEVICE

BACKGROUND OF THE INVENTION

1. Field of the Invention

The present invention relates to a laser measuring device, and more particularly to a laser measuring device comprising a housing having a non-symmetrical structure, so that when one of the casings of the housing is removed, the adjusting screws of the laser head are entirely exposed outward from the housing, thereby facilitating adjustment of the laser head or the levels.

2. Description of the Related Art

A conventional laser measuring device comprises two side covers, a laser head, a level, and a scrolling ruler. The laser head has a top provided with a plurality of adjusting screws. In assembly, the laser head and the level have to be calibrated by a horizontal platform. Then, the laser head and the level are bonded and fixed. Then, the two side covers are combined with each other, thereby assembling the conventional laser measuring device.

However, the adjusting screws are located at the center of the laser head, so that it is necessary to detach both of the two side covers to entirely expose the adjusting screws for adjustment of the laser head or the level, thereby causing inconvenience to the user in adjustment of the laser head and the level.

SUMMARY OF THE INVENTION

The primary objective of the present invention is to provide a laser measuring device, wherein the housing has a non-symmetrical structure, so that the laser measuring device can be assembled easily and rapidly.

Another objective of the present invention is to provide a laser measuring device, wherein the housing has a non-symmetrical structure, thereby shortening the volume of the laser measuring device.

A further objective of the present invention is to provide a laser measuring device, wherein the housing has a non-symmetrical structure, so that when one of the casings of the housing is removed, the adjusting screws of the laser head are entirely exposed outward from the housing, thereby facilitating adjustment of the laser head or the levels.

A further objective of the present invention is to provide a laser measuring device, wherein by provision of the two support racks of the laser head and the stepped extension, the levels of the two levels are adjusted by the adjusting screws of the laser head synchronously during calibration of the laser head.

In accordance with the present invention, there is provided a laser measuring device, comprising:

- a housing including a first casing, and a second casing combined with the first casing;
- the first casing of the housing has a lower end formed with a protruding support base; and
- the second casing of the housing has a lower end formed with a recess to receive the support base of the first casing of the housing.

Further benefits and advantages of the present invention will become apparent after a careful reading of the detailed description with appropriate reference to the accompanying drawings.

DETAILED DESCRIPTION OF THE INVENTION

Figure 1:
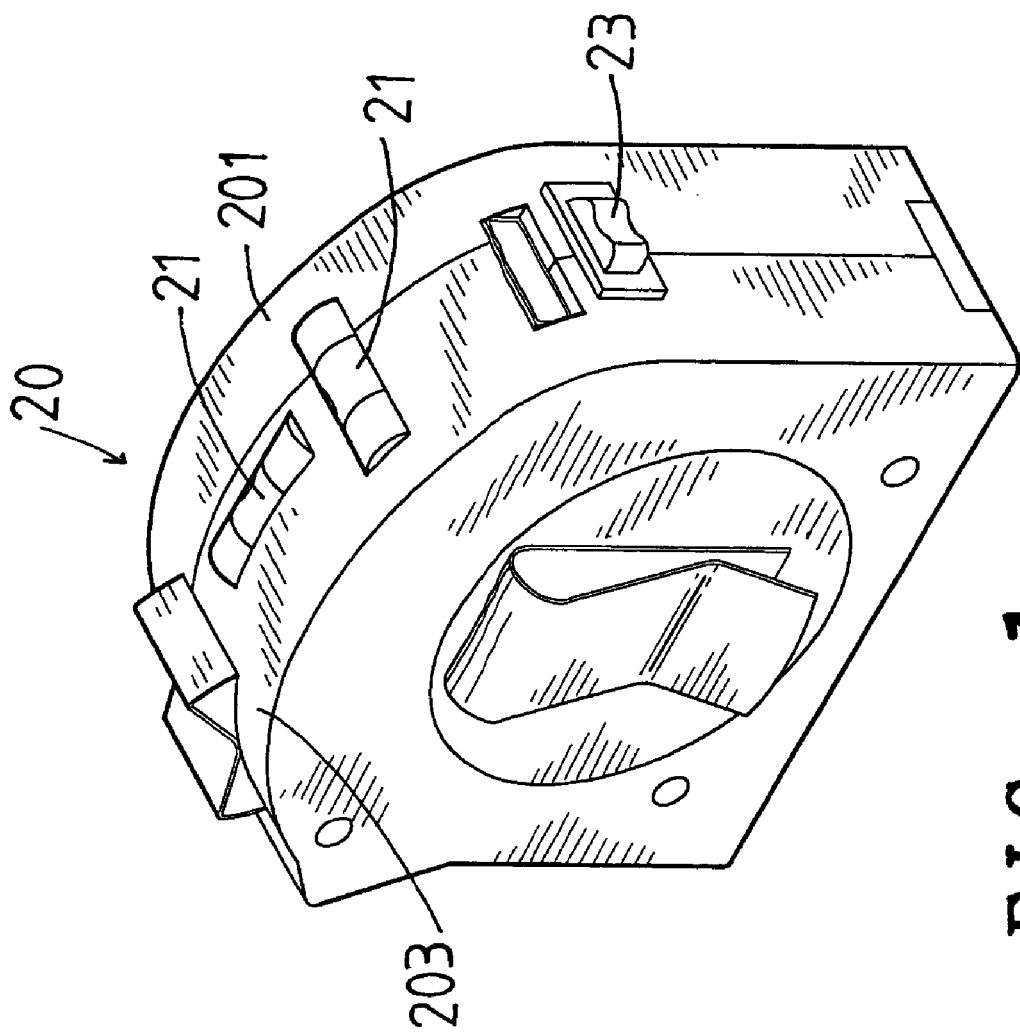
FIG. 1 is a perspective view of a laser measuring device in accordance with the preferred embodiment of the present invention.
Figure 2:
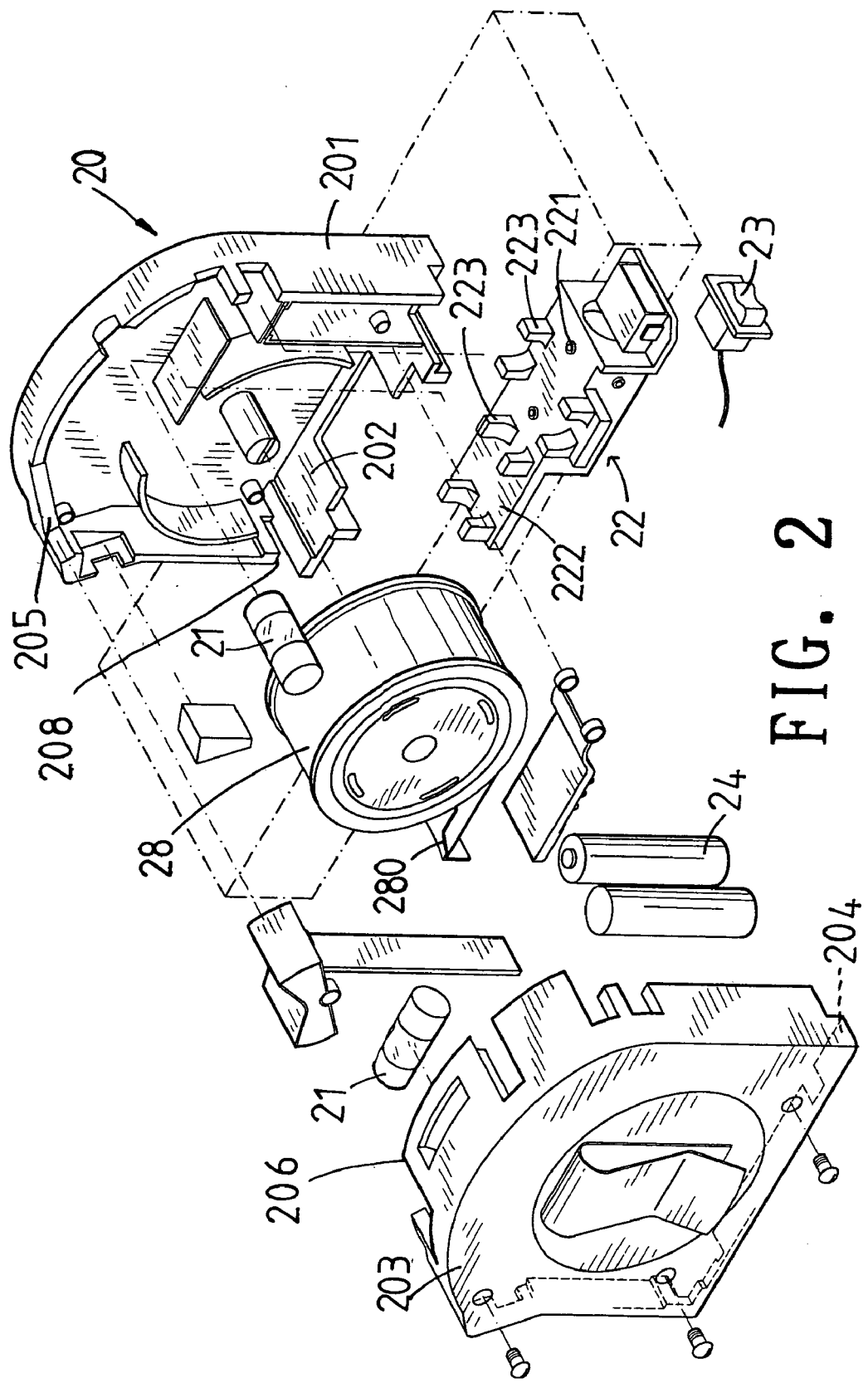
FIG. 2 is an exploded perspective view of the laser measuring device in accordance with the preferred embodiment of the present invention.

Referring to the drawings and initially to FIGS. 1–7, a laser measuring device in accordance with the preferred embodiment of the present invention comprises a housing 20, a laser head 22, two levels 21, a power supply 24, and a control knob 23.

The housing 20 has a non-symmetrical structure, and includes a first casing 201, and a second casing 203 combined with the first casing 201. The first casing 201 and second casing 203 of the housing 20 are non-symmetrical with each other.

Figure 3:
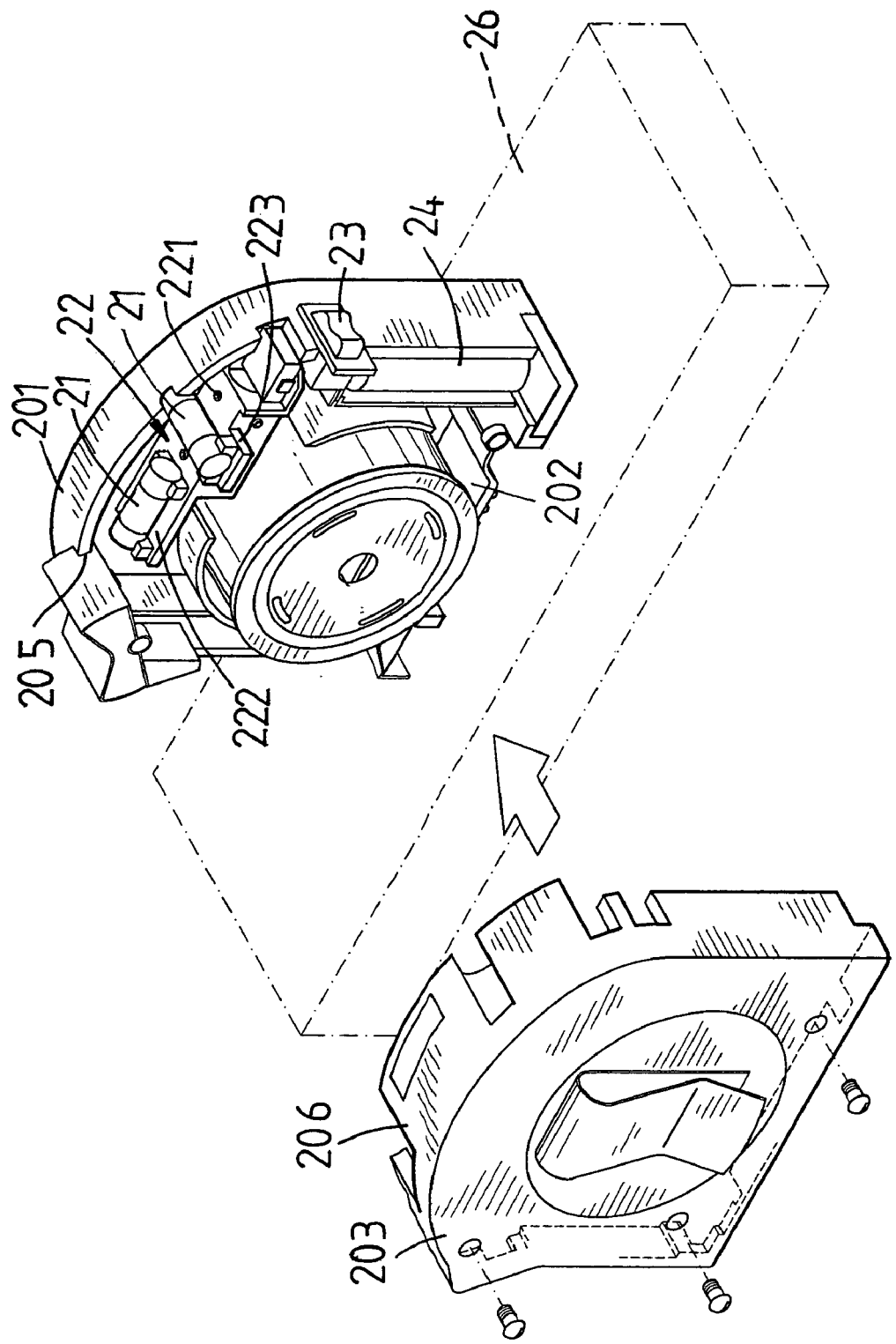
FIG. 3 is a partially exploded perspective view of the laser measuring device in accordance with the preferred embodiment of the present invention.
Figure 4:
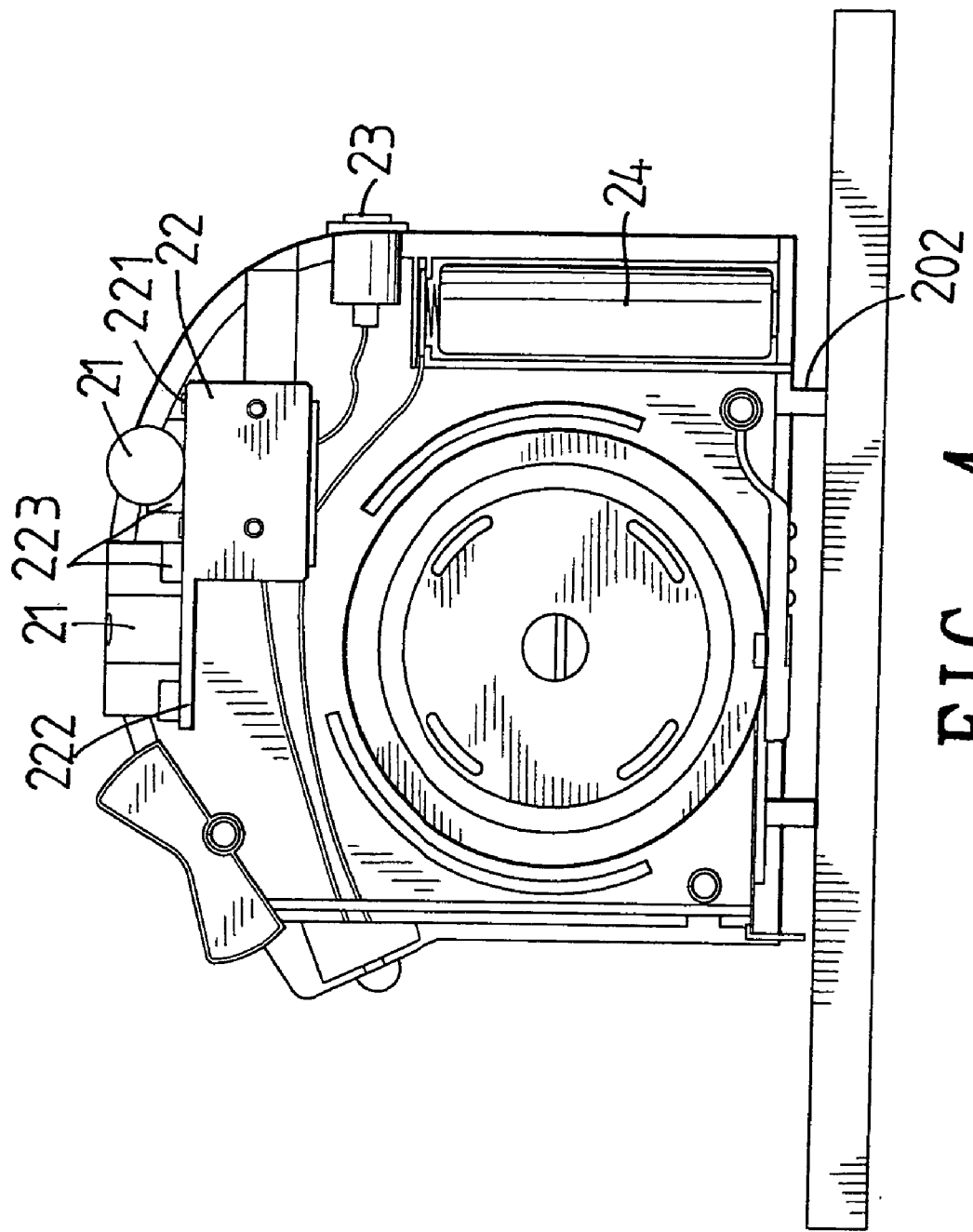
FIG. 4 is a cut-away plan view of the laser measuring device as shown in FIG. 1.
Figure 5:
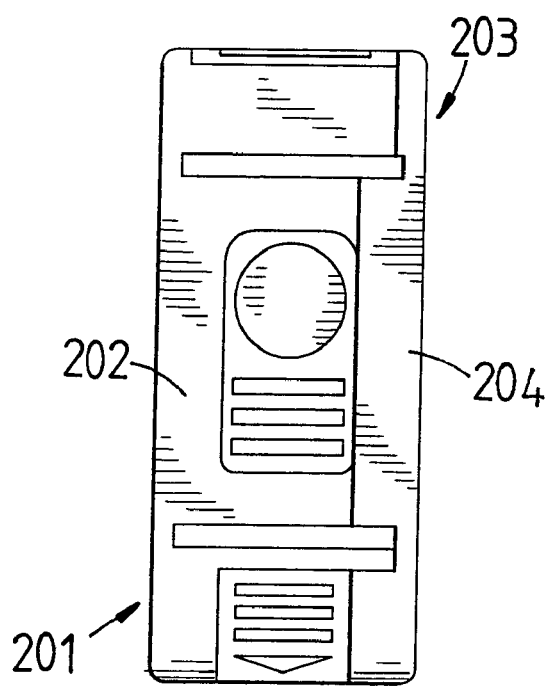
FIG. 5 is a bottom plan view of the laser measuring device as shown in FIG. 1.
Figure 6:
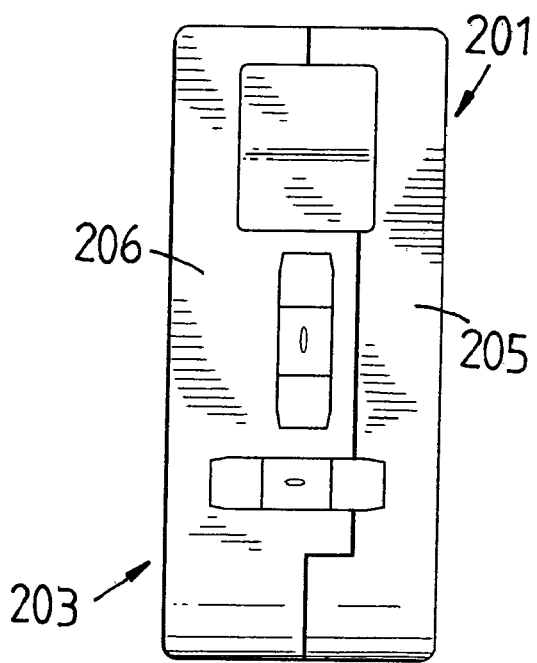
FIG. 6 is a top plan view of the laser measuring device as shown in FIG. 1.

The first casing 201 of the housing 20 has a non-symmetrical structure, and has an upper end formed with a concave portion 205 (see FIG. 6) and a lower end formed with a protruding support base 202 (see FIG. 5). The upper end and lower end of the first casing 201 of the housing 20 are non-symmetrical with each other. The support base 202 of the first casing 201 of the housing 20 is disposed at a horizontal state, so that the first casing 201 of the housing 20 is disposed at a vertical state and can be placed on a calibration platform 26 in a vertical manner as shown in FIG. 3.

The second casing 203 of the housing 20 has a non-symmetrical structure, and has an upper end formed with a convex portion 206 (see FIG. 6) received in the concave portion 205 of the first casing 201 of the housing 20 and a lower end formed with a recess 204 (see FIG. 5) to receive the support base 202 of the first casing 201 of the housing 20. The upper end and lower end of the second casing 203 of the housing 20 are non-symmetrical with each other.

The laser head 22 is mounted in the first casing 201 of the housing 20 and has a top provided with two support racks 223 and a plurality of adjusting screws 221. Preferably, the adjusting screws 221 of the laser head 22 aligns with the concave portion 205 of the first casing 201 of the housing 20, so that when the second casing 203 is removed from the first casing 201, the adjusting screws 221 of the laser head 22 are exposed outward from the concave portion 205 of the first casing 201 of the housing 20 as shown in FIG. 3, thereby facilitating adjustment of the laser head 22 and the two levels 21.

Each of the two levels 21 is mounted on and protruded outward from the housing 20 as shown in FIG. 1, and is located above the laser head 22. Preferably, one of the two levels 21 is directed toward a longitudinal direction of the housing 20, and the other one of the two levels 21 is directed toward a transverse direction of the housing 20. In addition, each of the two levels 21 is fixed on a respective one of the two support racks 223 of the laser head 22. The laser head 22 has an end formed with a stepped extension 222 for supporting one of the two levels 21.

The power supply 24 is mounted in the housing 20 and is connected to the laser head 22 to supply the electric power to the laser head 22.

The control knob 23 is mounted on and protruded outward from the housing 20 as shown in FIG. 1, and is connected to the power supply 24 to control operation of the power supply 24.

The laser measuring device further comprises a scrolling ruler 28 mounted in a center of the first casing 201 of the housing 20 and has a distal end extended outward from an opening 208 formed in the first casing 201 of the housing 20.

In assembly, the laser head 22 and the two levels 21 are positioned in the first casing 201 of the housing 20 and are calibrated. Then, the laser head 22 and the two levels 21 are bonded in the first casing 201 of the housing 20 after calibration, thereby fixing the laser head 22 in the first casing 201 of the housing 20. Then, the second casing 203 is combined with the first casing 201, thereby assembling the laser measuring device.

In such a manner, when the second casing 203 is removed from the first casing 201, the adjusting screws 221 of the laser head 22 are entirely exposed outward from the concave portion 205 of the first casing 201 of the housing 20 as shown in FIG. 3, thereby facilitating adjustment of the laser head 22 or the two levels 21. In addition, by provision of the two support racks 223 of the laser head 22 and the stepped extension 222, the levels of the two levels 21 are adjusted by the adjusting screws 221 of the laser head 22 synchronously during calibration of the laser head 22. Further, the housing 20 has a non-symmetrical structure, thereby shortening the volume of the laser measuring device. Further, the housing 20 has a non-symmetrical structure, so that the laser measuring device can be assembled easily and rapidly.

Figure 8:
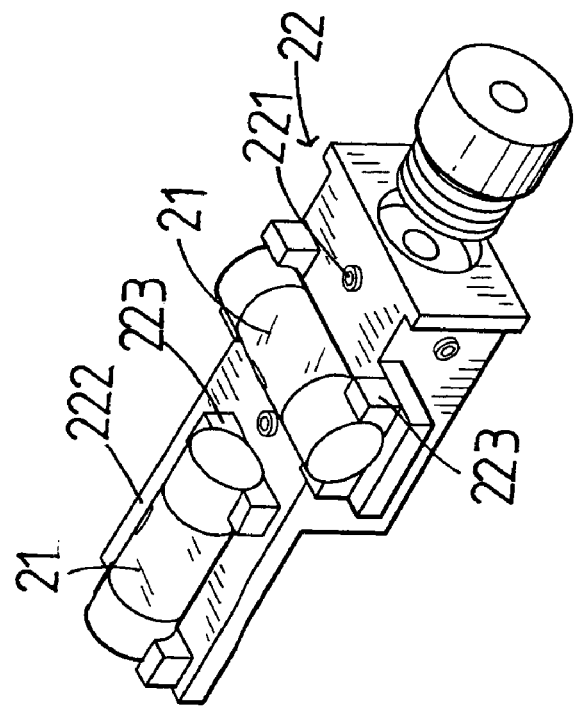
FIG. 8 is a perspective view of a laser head of the laser measuring device in accordance with another embodiment of the present invention.
Figure 7:
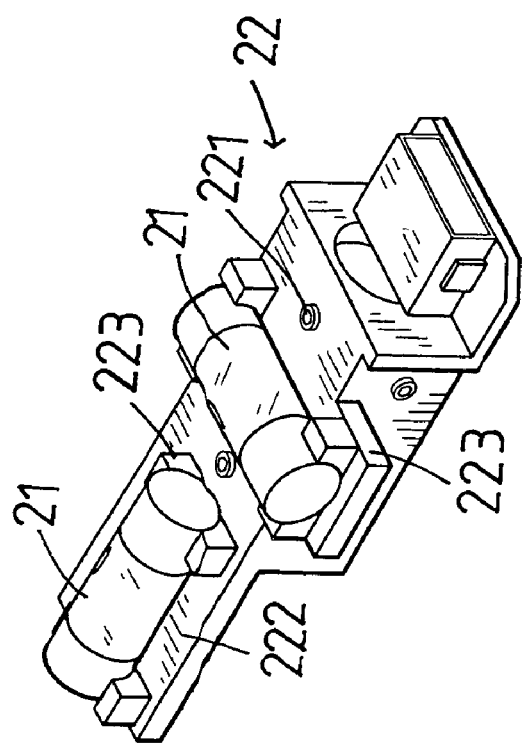
FIG. 7 is a perspective view of a laser head of the laser measuring device in accordance with the preferred embodiment of the present invention.

Referring to FIG. 8, the laser measuring device in accordance with another embodiment of the present invention is shown.

Although the invention has been explained in relation to its preferred embodiment(s) as mentioned above, it is to be understood that many other possible modifications and variations can be made without departing from the scope of the present invention. It is, therefore, contemplated that the appended claim or claims will cover such modifications and variations that fall within the true scope of the invention.

What is claimed is:

1. A laser measuring device, comprising:
    a housing including a first casing, and a second casing combined with the first casing; wherein
    the first casing of the housing has a lower end formed with a protruding support base; and
    the second casing of the housing has a lower end formed with a recess to receive the support base of the first casing of the housing;
    wherein the first casing of the housing has an upper end formed with a concave portion, and the second casing of the housing has an upper end formed with a convex portion received in the concave portion of the first casing of the housing.

2. The laser measuring device in accordance to claim 1, wherein the upper end and the lower end of the first casing of the housing are non-symmetrical with each other.

3. The laser measuring device in accordance with claim 1, wherein the upper end and lower end of the second casing of the housing are non-symmetrical with each other.

4. A laser measuring device, comprising:
    a housing including a first casing, and a second casing combined with the first casing;
    the first casing of the housing having a lower end formed with a protruding support base; and
    the second casing of the housing having a lower end formed with a recess to receive the support base of the first casing of the housing;
    a laser head mounted in the first casing of the housing and having a top provided with a plurality of adjusting screws aligning with a concave portion of the first casing of the housing, so that when the second casing is removed from the first casing, the adjusting screws of the laser head are exposed outwards from the concave portion of the first casing of the housing.

5. The laser measuring device in accordance with claim 4, further comprising two levels each mounted on and protruded outwards from the housing and each located above the laser head.

6. The laser measuring device in accordance with claim 5, wherein the top of the laser head is provided with two support racks, and each of the two levels is fixed on a respective one of the two support racks of the laser head.

7. The laser measuring device in accordance with claim 5, wherein the laser head has an end formed with a stepped extension for supporting one of the two levels.

8. The laser measuring device in accordance with claim 5, wherein one of the two levels is directed toward a longitudinal direction of the housing, and the other one of the two levels is directed toward a transverse direction of the housing.

9. The laser measuring device in accordance with claim 4, further comprising a power supply mounted in the housing and connected to the laser head to supply the electric power to the laser head.

10. The laser measuring device in accordance with claim 9, further comprising a control knob mounted on and protruded outward from the housing connected to the power supply to control operation of the power supply.

* * * * *